No. 636,857. Patented Nov. 14, 1899.
H. W. SHAW.
ACETYLENE GAS GENERATOR.
(Application filed Sept. 9, 1898.)
(No Model.)
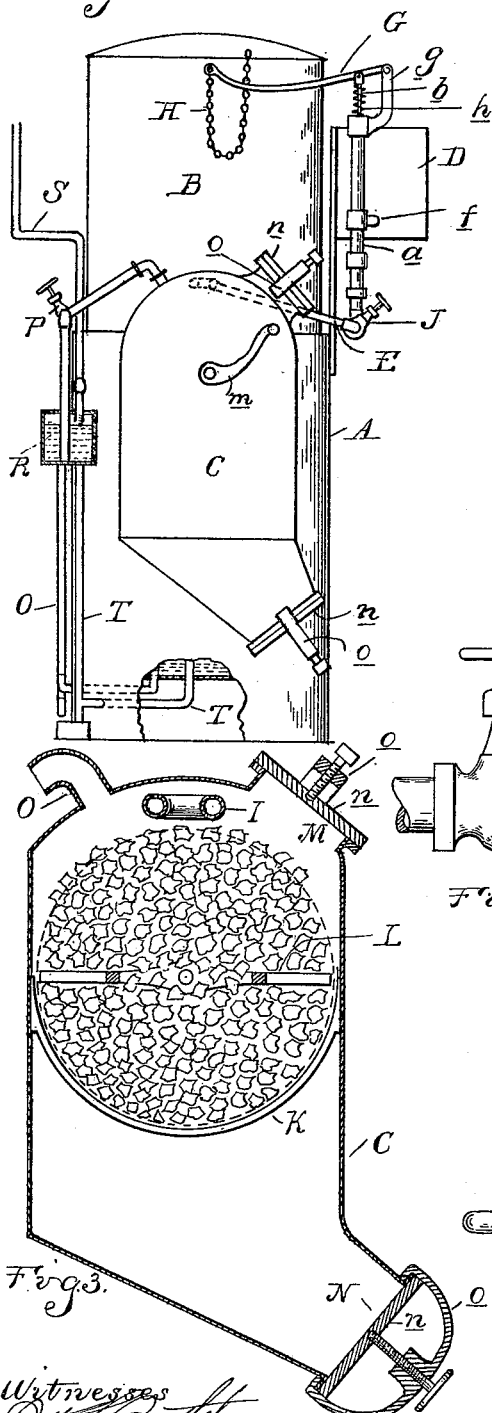
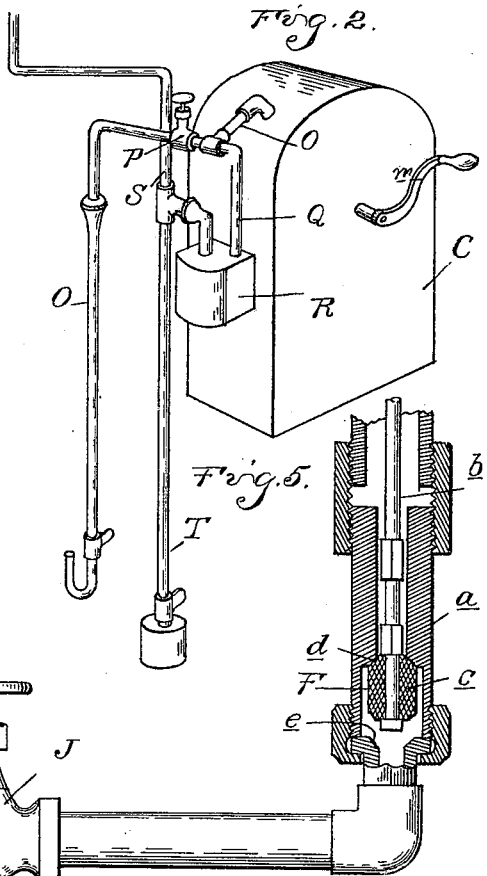
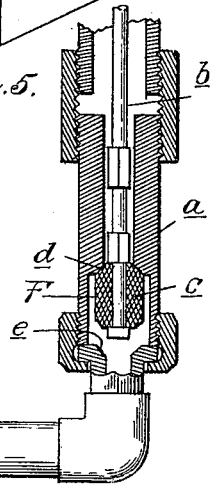
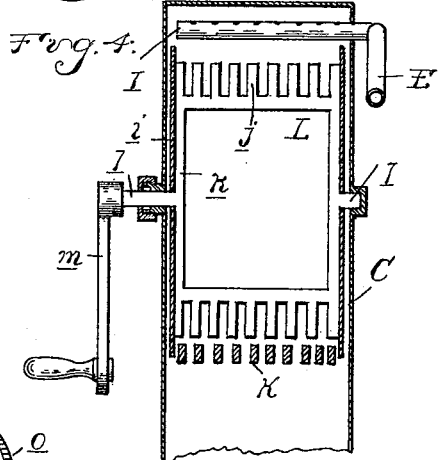
Inventor
Henry W. Shaw

UNITED STATES PATENT OFFICE.

HENRY W. SHAW, OF DETROIT, MICHIGAN, ASSIGNOR OF TWO-THIRDS TO FRANK P. CLEVELAND AND CHARLES W. CADWELL, OF SAME PLACE.

ACETYLENE-GAS GENERATOR.

SPECIFICATION forming part of Letters Patent No. 636,857, dated November 14, 1899.

Application filed September 9, 1898. Serial No. 690,567. (No model.)

*To all whom it may concern:*

Be it known that I, HENRY W. SHAW, a subject of the Queen of Great Britain, residing at Detroit, in the county of Wayne and State of Michigan, have invented certain new and useful Improvements in Acetylene-Gas Machines, of which the following is a specification, reference being had therein to the accompanying drawings.

My invention relates to apparatus for generating acetylene gas; and the invention consists in the peculiar construction, arrangement, and combination of parts, as more fully hereinafter described and claimed.

In the drawings, Figure 1 is a front elevation, partly in section, of my apparatus. Fig. 2 is a perspective view of the generating-chamber and some of its connections. Fig. 3 is a vertical central transverse section thereof. Fig. 4 is a central section at right angles to Fig. 2. Fig. 5 is a section through the regulating-valve for the generator.

A is the water-tank, and B is the gas-tank or "bell," of a gasometer, which may be of ordinary construction.

C is the generator-casing, preferably secured in front of the tank A, and D is the water-tank for supplying water to the generator, also preferably secured to the tank A, at one side thereof.

E is a pipe leading from the water-tank D to the top of the generator-casing and containing the controlling-valve F. This valve, as shown in Fig. 5, is preferably located in a vertical section $a$ of the pipe E, which extends up to above the water-level in the tank D and is open at its upper end. The valve comprises the valve-stem $b$, passing down through the pipe $a$, the valve-head $c$ thereon, preferably formed of rubber or other elastic material, and the seats $d$ and $e$ above and below said valve-head, said seats and valve being located in a portion of the pipe $a$ below its connection $f$ with the tank B.

G is a lever connected to the upper end of the valve-stem $b$ and fulcrumed to a bracket $g$, secured to the pipe $a$.

$h$ is a spring sleeved upon the stem above the pipe $b$ and serving to hold said stem normally in its open position, with the valve-head against the upper seat $d$.

H is a chain or similar connection between the end of the lever G and the gas-bell B, adapted when said bell falls below a certain point to draw down said lever and operate the valve F.

I is the sprinkler within the casing C, with which the pipe E connects. This sprinkler consists of one or more pipes perforated along the top and extending across near the top of the casing C. Outside of the casing the pipe E drops sufficiently to form a trap between the valve F and the sprinkler, which is permanently filled with water. A shut-off valve J is preferably also placed in the pipe E, below the valve F.

Within the casing C is arranged a segmental, preferably a semicylindrical, grating K, which divides the chamber into a carbid-receptacle above and a refuse-receptacle below.

L is a rotary scraper or rake arranged above and concentric with the grate K. This preferably comprises the sheet-metal side disks $i$ and the cross-rakes $j$, the latter being preferably cast integral with arms $k$, having trunnions $l$, one of which passes out through the side of the casing and is provided with a crank-handle $m$.

The casing C is provided with the fill-opening M on the top and the discharge-opening N, preferably at the end of the tapering portion of the refuse-receptacle. Both of these openings are provided with suitable gas-tight covers, such as the lids $n$, held in position by the clamps $o$.

O is the gas-outlet pipe leading from the top of the generator-casing and passing down into the bottom of the tank A and up again into the gas-tank B. This pipe contains the shut-off valve P, and between said valve and the generator is connected an escape-pipe Q, which passes into a water seal R, the latter being connected to the pipe S, leading outside the building. T is another escape-pipe connecting with the pipe S and passing into the gasometer, where it is provided with any suitable means of opening when the gas-bell rises above the point of safety.

In the operation of the device a charge of carbid of calcium is first introduced into the generator-casing through the fill-opening M, which charge may, if desired, be sufficient in quantity to last for a number of days in the ordinary use of the generator. The opening M is then covered, and the valves J and P, which were previously closed, are opened. If the gasometer is empty, the valve F may be first operated by hand to introduce an initial charge of water into the generator, which, passing through the pipe E into the sprinkler I, will overflow through the perforations in the top of said sprinkler and drop upon the charge of carbid. The gas generated will pass through the pipe O into the gasometer, from which it may be drawn off through suitable service connections. (Not shown.) When the bell B of the gasometer falls again by reason of the drawing off of the gas therefrom, the chain H will draw down the lever G, opening the valve F by moving the head c away from the seal d, which will permit water to flow from the tank D through the pipe E into the sprinkler I and overflow therefrom, dropping upon the carbid, as before described, and again causing the generation of gas. If from any cause, such as failure to open the valve P, gas should not be admitted to the gasometer, so that instead of raising the bell it should continue to fall, this action will again close the valve F by pressing the valve-head c against the lower seat e, thus shutting off the water, so as to prevent further generation of gas. As, however, the water already admitted would generate a considerable volume of gas, escape is provided therefor through the pipe Q, water seal R, and pipe S, leading outside the building.

In the construction of generators of this type difficulty has been experienced in preventing the after-generation of gas—i. e., the slow generation of gas when the machine is temporarily out of use, as in the daytime—due to the presence of a certain amount of moisture in the generator-casing. To avoid this, many machines have been constructed with generators of only sufficient capacity to last for one night; but inasmuch as the consumption of gas will vary from day to day this expedient does not avoid the difficulty of after-generation, but only introduces a new one of possible failure of gas when the machine is used to its maximum capacity for more than the usual length of time. In my construction I prevent the after-generation, first, by the means employed for controlling the water-supply, and, second, by the means for readily removing the spent carbid or lime to prevent it from absorbing and holding moisture, which will subsequently come into contact with the fresh carbid and cause generation of gas.

As before described, the sprinkler and water-supply pipe therefor are so arranged as to remain constantly full of water trapped therein. Thus the instant the valve F is opened water will be displaced from the supply-pipes and sprinkler and fall upon the carbid, while the closing of the valve will as instantly stop the flow. This will prevent an oversupply of water in the generator-chamber, due to drainage of the supply-pipe.

The removal of refuse or spent carbid is accomplished by turning the crank-handle m through a half-revolution, which will cause the rakes j to revolve the mass of carbid, carrying the spent material from the top to the bottom of the mass or directly above the grate K. Then by moving the handle back and forth this refuse material will be shaken out through the grate into the receptacle below, from which it can be removed as often as necessary through the opening N. The efficiency of this device is due, first, to the fact that the mass of carbid is turned upside down, and, second, to the raking of the mass back and forth on the stationary grate-bars until all of the refuse is forced through. The carbid which is turned up upon the reversal of the rake is free from refuse, and thus the water dropping upon it will be utilized in the generation of gas instead of being absorbed by the lime.

With proper care the generator-chamber of my apparatus may be kept entirely free from moisture, excepting that which is immediately utilized in the generation of gas.

What I claim as my invention is—

1. In an acetylene-gas apparatus, a gas-generator consisting of a casing having a water-inlet connection near its top, a rotary rake for overturning a portion of the carbid, and a curved grating, arranged beneath the rake and in proximity thereto, adapted to support the carbid, said grate comprising a series of independent, longitudinally-curved bars curved in the plane of the movement of the rake and separated from one another to form unrestricted longitudinal openings in the grating from end to end for the purpose set forth.

2. In an acetylene-gas apparatus, the combination with the generator-casing having a water-inlet connection near its top, a grating in said casing supporting the carbid, a rectangular frame having a hollow center, mounted for rotary movement above the grating and outwardly-extending rigid teeth upon the opposite ends of the frame adapted to engage with and overturn a portion of the carbid.

3. In an acetylene-gas apparatus, the combination with the generator-casing, a valve-controlled water-supply pipe arranged without and in a plane parallel with the casing, a pipe extending within the casing, said pipe communicating with and extending upwardly from at an acute angle to the supply-pipe, and a transverse pipe within the casing communicating with the pipe extending within the casing at its upper end, said transverse pipe being provided with a series of perforations formed in its upper side.

In testimony whereof I affix my signature in presence of two witnesses.

HENRY W. SHAW.

Witnesses:
M. B. O'DOGHERTY,
OTTO F. BARTHEL.